June 17, 1941.　　　J. J. McDONALD　　　2,245,800
MOTOR VEHICLE ELEVATING DEVICE
Filed Aug. 2, 1940　　　2 Sheets-Sheet 1

Inventor
Joseph J. McDonald
By Clarence A. O'Brien
Attorney

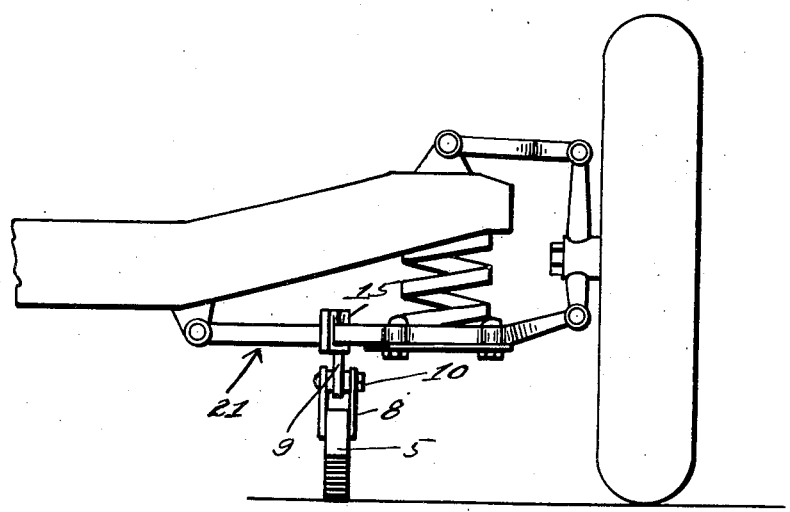
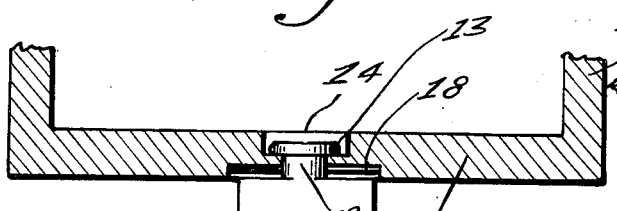
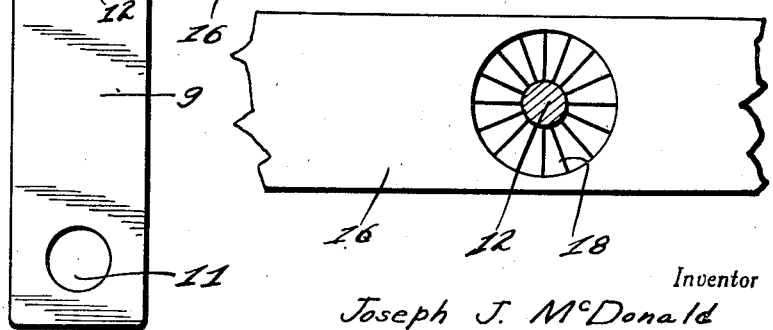

Patented June 17, 1941

2,245,800

UNITED STATES PATENT OFFICE 2,245,800

MOTOR VEHICLE ELEVATING DEVICE

Joseph J. McDonald, Lebanon, Pa.

Application August 2, 1940, Serial No. 349,574

4 Claims. (Cl. 254—94)

This invention relates to motor vehicle wheel elevating devices, and has for the primary object the provision of a device of this character which will be extremely durable, compact and efficient for the raising of a wheel of a motor vehicle through the use of this device in conjunction with either the forward or rearward movement of the vehicle and which may be easily and quickly attached and removed from the vehicle when desired and especially on automobiles of the latest design wherein it is practically impossible to employ the conventional type of jack due to the extremely small road clearance provided on automobiles making it impossible to place the jack under the axle when the tire of the wheel is deflated.

With these and other objects in view as will become more apparent as the description proceeds, the invention consists in certain novel features of construction, combination and arrangement of parts to be hereinafter more fully described and claimed.

For a complete understanding of my invention, reference is to be had to the following description and accompanying drawings, in which—

Figure 5 is a fragmentary front elevation illustrating the application of the present invention to the knee action construction found on the front end of a motor vehicle.

Figure 6 is a fragmentary bottom plan view, partly in section, of the clamp.

Figure 7 is a fragmentary side elevation partly in section, drawn on an enlarged scale, illustrating the connection between the spring clamp and the connecting link of the present invention.

Figure 8 is an end view illustrating the connecting member.

Figure 1:
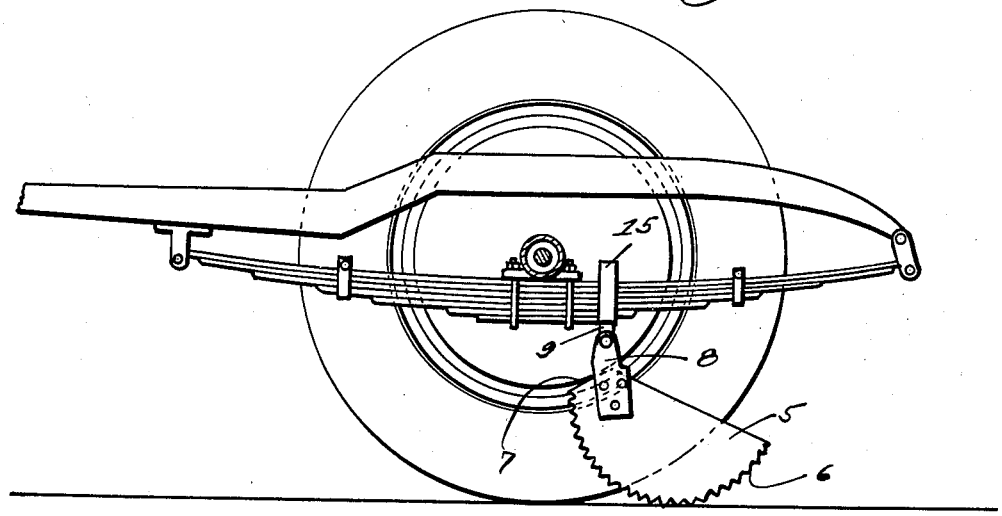
Figure 1 is a fragmentary side elevation, partly in section, illustrating the application of the present invention to the rear springs of a motor vehicle for the purpose of elevating the wheel adjacent said springs from the ground.
Figures 2, 3, 4:
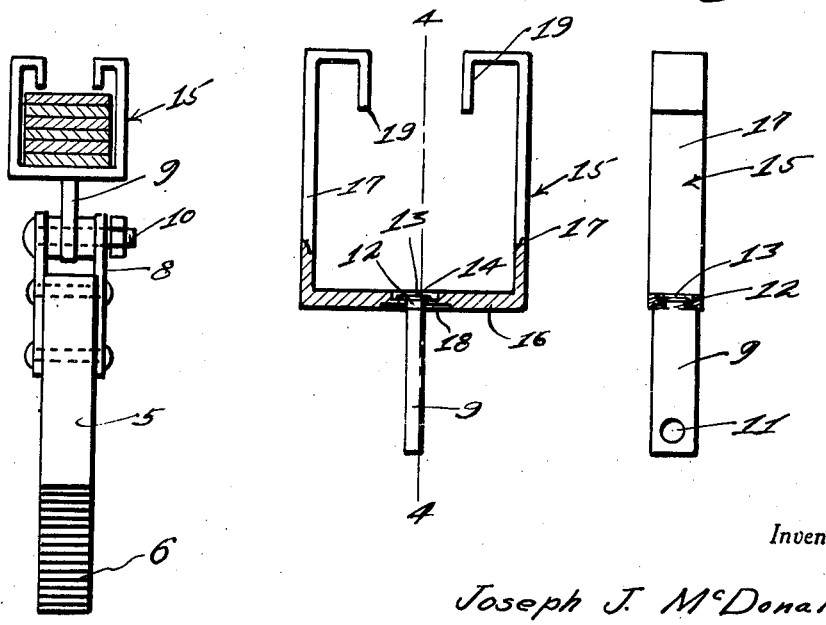
Figure 2 is a transverse sectional view showing clearly how the present invention is secured on the springs.
Figure 3 is a side elevation partly in section illustrating the spring clamp of the present invention.
Figure 4 is a transverse sectional view taken on the line 4—4 of Figure 3.

Referring in detail to the drawings, the numeral 5 indicates a segmental shaped fulcrum member which is adapted to be brought into engagement with the ground and attached onto the vehicle so that by imparting a rearward movement to the vehicle the wheel adjacent said member 5 will be elevated from the ground to permit tire repair or change to be easily carried out.

It is to be understood that the arcuately curved face of the member 5 is placed in engagement with the ground and is preferably serrated, as shown at 6, to bite into the ground to prevent slipping.

It is preferable that one corner of the segmental shaped member 5 be cut away, as shown at 7, and has secured thereon a bracket 8 consisting of spaced ears to which is journaled a connecting member 9. A bolt 10 is employed for forming the journal so that the member 5 can at any time desired be detached from the connecting member. The bolt 10 extends through an opening 11 located adjacent one end of the connecting member 9 as well as through openings provided in the ears constituting the bracket 8. The other end of the connecting member is reduced to form a shank 12 having a head 13 thereon. The shank 12 operates within an opening 14 provided in an attaching clamp 15 which is of substantially U shape including the connecting portion 16 and parallel arms 17. It is preferable that the opening 14 be of countersunk formation with teeth 18 provided on the walls thereof. It is also essential that a limited amount of play be provided between the attaching clamp 15 and the connecting member 9 so that the clamp can be rotated thereon when the device is free of the weight of a vehicle. However, when the weight of the vehicle is on the device, the connecting member engages with the teeth 18 of the attaching clamp and prevents rotation of the connecting member with respect to the clamp and also maintains the fulcrum member 5 in proper position for the elevation of the vehicle.

The extremities of the arms 17 of the clamp 15 are bent into substantially L shape, as shown at 19. These extremities are adapted to facilitate the anchoring of the clamp either on the spring of the vehicle or on the knee action construction of the vehicle, as shown in Figure 5.

In employing the invention on the rear spring of a motor vehicle the attaching clamp 15 is slid onto the spring from the rear end towards the rear axle of the vehicle. This can be easily carried out owing to the fact that the rear end of the vehicle spring is convenient to reach. When the attaching clamp occupies a position on the spring adjacent the rear axle the fulcrum member 5 is in engagement with the ground and owing to the pivotal connection between the clamp and the connecting member the fulcrum member can be easily adjusted to parallel the wheel to be elevated. The vehicle is then moved rearwardly and as the vehicle moves rearwardly the wheel adjacent the member 5 is elevated away from the ground to a distance sufficient to permit easy and quick removal of the tire on the wheel.

Thus it will be seen that the application of the device and the elevation of a wheel of the vehicle can be easily accomplished by anyone requiring only a minimum amount of effort.

To remove the vehicle from its elevated position on the present invention it is only necessary to move the vehicle forwardly and the clamp 15 then can be slid rearwardly on the spring and removed therefrom. To apply the present invention on the knee action as indicated by the character 21 in Figure 5, the clamp is applied to one of the arms forming a part of the knee action and by moving the vehicle forwardly the wheel adjacent to the fulcrum member 5 will be raised from the ground.

While I have shown and described the preferred embodiment of my invention, it will be understood that minor changes in construction, combination and arrangement of parts may be made without departing from the spirit and scope of the invention claimed.

Having described the invention, what I claim is:

1. In a vehicle elevating device, a substantially segmental shaped ground engaging member presenting an arcuately curved face having serrations thereon, a bracket attached to one end of said member, and a substantially U-shaped clamp pivotally connected to said bracket for detachably securing said member on a vehicle.

2. In a vehicle elevating device, a substantially segmental shaped ground engaging element having an arcuately curved serrated face to engage with the ground, a bracket secured to said member, a connecting member detachably and pivotally connected to said bracket, and a clamp rotatably connected to said connecting member to engage with a part of a motor vehicle.

3. In a vehicle elevating device, a substantially segmental shaped ground engaging element having an arcuately curved serrated face to engage with the ground, a bracket secured to said member, a connecting member detachably and pivotally connected to said bracket, said connecting member having a reduced end to provide a shank and a head, a substantially U-shaped attaching clamp provided with an opening to receive said head and shank to permit the clamp to rotate thereon, teeth formed on the clamp to engage with the connecting member to prevent rotation of the clamp on the connecting member when under a load.

4. In a vehicle elevating device, a substantially segmental shaped ground engaging element having an arcuately curved serrated face to engage with the ground, a bracket secured to said member, a connecting member detachably and pivotally connected to said bracket, said connecting member having a reduced end to provide a shank and a head, a substantially U-shaped attaching clamp provided with an opening to receive said head and shank to permit the clamp to rotate thereon teeth formed on the clamp to engage with the connecting member to prevent rotation of the clamp on the connecting member when under a load, said substantially U-shaped clamp including substantially L-shaped extremities.

JOSEPH J. McDONALD.